United States Patent
Carlson et al.

(10) Patent No.: US 12,026,550 B1
(45) Date of Patent: Jul. 2, 2024

(54) CRYPTOMINING HEAT MANAGEMENT

(71) Applicant: Auradine, Inc., Santa Clara, CA (US)

(72) Inventors: David Carlson, Haslet, TX (US); Nicholas Cabi, San Jose, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/239,977

(22) Filed: Aug. 30, 2023

Related U.S. Application Data

(60) Provisional application No. 63/529,308, filed on Jul. 27, 2023.

(51) Int. Cl.
*G06F 9/48* (2006.01)

(52) U.S. Cl.
CPC ................ *G06F 9/4893* (2013.01)

(58) Field of Classification Search
CPC .................................................... G06F 9/4893
See application file for complete search history.

(56) References Cited

U.S. PATENT DOCUMENTS

2015/0169016 A1* 6/2015 Doshi ................ G06F 11/3031
713/320

FOREIGN PATENT DOCUMENTS

| CN | 115794584 | * | 3/2023 |
| KR | 102594124 | * | 10/2023 |
| TW | 202340911 | * | 10/2023 |

OTHER PUBLICATIONS

Yan, Le, Lin Zhong, and Niraj K. Jha. "User-perceived latency driven voltage scaling for interactive applications." Proceedings of the 42nd Annual Design Automation Conference. 2005. (Year: 2005).*

* cited by examiner

*Primary Examiner* — Charlie Sun
(74) *Attorney, Agent, or Firm* — Fish & Richardson P.C.

(57) ABSTRACT

In an example method, a system accesses sensor data representing a temperature of one or more computer chips of a computer system configured to perform a cryptographic operation, and determines that the temperature has exceeded a threshold temperature. In response, the system dynamically adjusts a target computing performance of the one or more computer chips. Dynamically adjusting the target computing performance includes decreasing the target computing performance of the one or more computer chips by a first level; subsequent to decreasing the target computing performance of the one or more computer chips by the first level, determining that the temperature is less than the threshold temperature; and responsive to determining that the temperature is less than the threshold temperature, incrementally increasing the target computing performance of the one or more computer chips by a second level, where the first level is greater than the second level.

18 Claims, 4 Drawing Sheets

CRYPTOMINING HEAT MANAGEMENT

CROSS-REFERENCE TO RELATED APPLICATIONS

This application claims priority to U.S. Provisional Patent Application 63/529,308, filed on Jul. 27, 2023, the contents of which are hereby incorporated by reference herein in its entity.

TECHNICAL FIELD

This disclosure relates generally to techniques for cryptomining heat management.

BACKGROUND

A large number of cryptomining assets (e.g., computers that perform computation tasks for mining cryptocurrencies and/or other cryptographic operations) may be utilized to perform complex cryptomining tasks. Due to the complexity of the cryptomining tasks, each asset can consume a large amount of power and generate a large amount of heat. A major heat source within an asset is at the junctions of transistors in chips (e.g., application specific integrated circuits [ASICs]).

SUMMARY

The present disclosure describes methods, apparatuses, and systems to manage heat dissipation in a cryptomining asset.

In general, a cryptomining asset can include computer chips (e.g., ASICs) for performing computation tasks to mine a cryptocurrency. During operation of the cryptomining asset, the computer chips generate heat, which can be dissipated passively (e.g., using one or more heat sinks) and/or actively (e.g., using one or more fans).

Further, a cryptomining asset can include a heat management system that dynamically adjusts a target computing performance of the computer chips to manage the heat that is generated by the computer chips during operation. For example, the heat management system can obtain sensor data representing a temperature of the computer chips (e.g., a temperature at one or more junctions of the transistors of the computer chips) and determine whether the temperature has exceeded a threshold temperature (e.g., a maximum allowable temperature at which the computer chips are permitted to operate). If so, the heat management system reduces the target computing performance of the computer chips, such as by reducing a supply voltage that is provided to the computer chips and/or reducing a clock frequency of the computer chips). In particular, reducing the supply voltage and/or the clock frequency results in a corresponding drop of the temperature of the computer chips.

Upon determining that the temperature has dropped below the threshold temperature, the heat management system can incrementally increase the target computing performance of the computer chips back towards its original setting (e.g., by incrementally increasing the supply voltage and/or the clock frequency of the computer chips one or more times back towards their original values). If the temperature has reached an acceptable steady state (e.g., less than the threshold temperature), the heat management can maintain the target computing performance of the computer chips and/or continue increasing the target computing performance further. However, if the temperature again exceeds the threshold temperature, the heat management system can again decrease the target computing performance of the computer chips (e.g., by again reducing the supply voltage and/or the clock frequency of the computer chips).

The heat management system can iteratively perform this process until optimized operating parameters are determined for the computer chips. As an example, the optimized operating parameters can include a particular supply voltage and a particular clock frequency that provides high computing performance in a thermally stable manner.

The implementations described herein can provide various technical benefits. For example, the heat management system can dynamically adjust the target computing performance of the computer chips of a cryptomining asset, such that the cryptomining asset can perform computation tasks in a thermally stable manner. This can prevent (or otherwise reduce) the likelihood of heat-related failure of the computer chips. Accordingly, the cryptomining asset can operate more reliably and/or efficiently under various thermal conditions.

In as aspect, a heat management method includes: obtaining, using one or more sensors, an internal junction temperature of a chip of a cryptomining asset: determining that the internal junction temperature reaches a threshold: and dynamically adjusting a target computing performance of the chip.

Implementations of this aspect can include one or more of the following features.

In some implementations, dynamically adjusting the target computing performance of the chip can include: decreasing, by a first predetermined level, a target computing performance of the chip: and in response to determining that the internal junction temperature is below the threshold, increasing, by a second predetermined level, the target computing performance of the chip.

In some implementations, the method can further include: air cooling the cryptomining asset.

In some implementations, the method can further include obtaining, using the one or asset sensors, ambient temperature of the cryptomining asset, where dynamically adjusting the target computing performance of the chip is based on the ambient temperature of the cryptomining asset.

In another aspect, a method includes: accessing, by one or more processors, sensor data representing a temperature of one or more computer chips of a computer system configured to perform a cryptographic operation: determining, by the one or more processors based on the sensor data, that the temperature has exceeded a threshold temperature: and responsive to determining that the temperature has exceeded the threshold temperature, dynamically adjusting, by the one or more processors, a target computing performance of the one or more computer chips. Dynamically adjusting the target computing performance of the one or more computer chips includes: decreasing the target computing performance of the one or more computer chips by a first level: subsequent to decreasing the target computing performance of the one or more computer chips by the first level, determining that the temperature is less than the threshold temperature: and responsive to determining that the temperature is less than the threshold temperature, incrementally increasing the target computing performance of the one or more computer chips by a second level, where the first level is greater than the second level.

Implementations of this aspect can include one or more of the following features.

In some implementations, the cryptographic operation can include mining a cryptocurrency.

In some implementations, dynamically adjusting the target computing performance of the one or more computer chips can include at least one of: adjusting a supply voltage of the one or more computer chips, or adjusting a clock frequency of the one or more computer chips.

In some implementations, dynamically adjusting the target computing performance of the one or more computer chips can include: adjusting a supply voltage of the one or more computer chips, and adjusting a clock frequency of the one or more computer chips.

In some implementations, decreasing the target computing performance of the one or more computer chips by the first level can include: decreasing a supply voltage of the one or more computer chips by a first voltage value, and decreasing a clock frequency of the one or more computer chips by a first frequency value.

In some implementations, incrementally increasing the target computing performance of the one or more computer chips by the second level can include sequentially increasing the supply voltage of the one or more computer chips by a second voltage value a plurality of times, where the second voltage value is less than the first voltage value.

In some implementations, the method can further include: while incrementally increasing the target computing performance of the one or more computer chips by the second level, determining, based on the sensor data, that the temperature has re-exceeded the threshold temperature, and responsive to determining that the temperature has re-exceeded the threshold temperature, decreasing the target computing performance of the one or more computer chips by a third level.

In some implementations, decreasing the target computing performance of the one or more computer chips by the third level can include: decreasing the supply voltage of the one or more computer chips by a third voltage value, and decreasing a clock frequency of the one or more computer chips by a third frequency value.

In some implementations, the method can further include: determining that the supply voltage of the one or more computer chips is less than a threshold voltage, and responsive to determining that the supply voltage of the one or more computer chips is less than the threshold voltage, causing the one or more computer chips to transition to an idle state.

In some implementations, the method can further include: determining that the clock frequency of the one or more computer chips is less than a threshold frequency, and responsive to determining that the clock frequency of the one or more computer chips is less than the threshold frequency, causing the one or more computer chips to transition to an idle state.

In some implementations, dynamically adjusting the target computing performance of the one or more computer chips can include: determining, based on the sensor data, that the temperature has reached a steady state while the target computing performance of the one or more computer chips is at a particular target computing performance level, and responsive to determining that the temperature has reached a steady state while the target computing performance of the one or more computer chips is at the particular target computing performance level, maintaining the target computing performance of the one or more computer chips at the particular target computing performance level.

In some implementations, the sensor data can represent internal junction temperature of the one or more computer chips.

In some implementations, the sensor data can further represent a temperature of an ambient temperature of the computer system, and the method can include dynamically adjusting the target computing performance of the one or more computer chips based on the ambient temperature.

In some implementations, the sensor data can represent a temperature of a plurality of computer chips of the computer system, and the target computing performance of the plurality of computer chips can be dynamically adjusted based on the sensor data.

In some implementations, the sensor data can represent a temperature of a single computer chip of the computer system, and the target computing performance of the single computer chip can be dynamically adjusted based on the sensor data.

In another aspect, a system includes: a computer system configured or mine a cryptocurrency, where the computer system includes: one or more computer chips, one or more sensors configured to generate sensor data representing the temperature of the one or more computer chips, and control circuitry communicatively coupled to the one or more computer chips and the one or more sensors. The control circuitry is configured to: access the sensor data: determine, based on the sensor data, that the temperature has exceeded a threshold temperature: responsive to determining that the temperature has exceeded the threshold temperature, dynamically adjust a target computing performance of the one or more computer chips. Dynamically adjusting the target computing performance of the one or more computer chips includes: decreasing the target computing performance of the one or more computer chips by a first level: subsequent to decreasing the target computing performance of the one or more computer chips by the first level, determine that the temperature is less than the threshold temperature: and responsive to determining that the temperature is less than the threshold temperature, incrementally increasing the target computing performance of the one or more computer chips by a second level, wherein the first level is greater than the second level.

In another aspect, one or more non-transitory computer readable media store instructions that, which executed by one or more processors, causes the one or more processors to perform operations. The operations include: accessing sensor data representing a temperature of one or more computer chips of a computer system configured to mine a cryptocurrency: determining, based on the sensor data, that the temperature has exceed a threshold temperature: and responsive to determining that the temperature has exceeded the threshold temperature, dynamically adjusting a target computing performance of the one or more computer chips. Dynamically adjusting the target computing performance of the one or more computer chips includes: decreasing the target computing performance of the one or more computer chips by a first level: subsequent to decreasing the target computing performance of the one or more computer chips by the first level, determining that the temperature is less than the threshold temperature; and responsive to determining that the temperature is less than the threshold temperature, incrementally increasing the target computing performance of the one or more computer chips by a second level, where the first level is greater than the second level.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers in the figures indicate like elements.

DETAILED DESCRIPTION

An asset can fail due to overheat, so it is important to properly and timely cool the asset. One way of cooling the asset is to use fans to blow air over the asset. However, when ambient temperature increases (e.g., due to changes in the weather), the effectiveness of air cooling can decrease. A user of the asset may have to turn off the asset due to unsatisfactory cooling performance. Keeping an asset idle due to heat can lead to reduced cryptomining efficiency.

According to one or more implementations, an asset can be cooled by dynamically adjusting the supply voltage and/or operation frequency of the chips with limited performance impact. Typically, the supply voltage and the operation frequency of a chip are positively correlated to both the heat generation and the computing performance. One or more implementations dynamically adjust either or both of the two parameters to achieve a balance between heat and performance.

Figure 1:
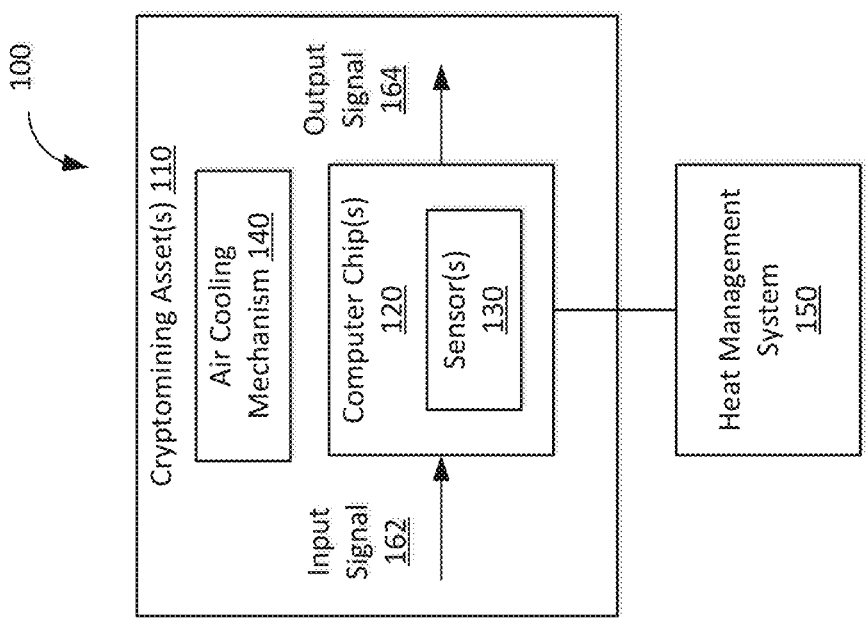
FIG. 1 illustrates a block diagram of an example system for mining cryptocurrency.

As an example, FIG. 1 shows a system 100 for mining cryptocurrency. The system 100 includes one or more cryptomining assets 110 and a heat management system 150 communicatively coupled to the one or more cryptomining assets 110 (e.g., via one or more wired or wireless interconnections).

In general, each of the cryptomining assets 110 is configured to mine a cryptocurrency using one or more computer chips 120. As an example, each of the cryptomining assets 110 can any number of electronic devices that are configured to receive, process, and transmit data. Examples of the cryptomining assets include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the cryptomining assets 110 can include computing devices that operate using one or more operating systems (e.g., Microsoft Windows, Apple macOS, Linux, Unix, Google Android, and Apple IOS, among others) and one or more architectures (e.g., x86, PowerPC, and ARM, among others). In some implementations, one or more of the cryptomining assets 110 need not be located locally with respect to the rest of the system 100, and one or more of the cryptomining assets 110 can be located in one or more remote physical locations.

Each of the cryptomining assets 110 includes one or more computer chips 120 to perform computation tasks to facilitate the mining of a cryptocurrency (e.g., validating previously conducted transactions in exchange for an amount of cryptocurrency). In some implementations, one or more of the computer chips 120 can be an application specific integrated circuit (ASIC). In general, a cryptocurrency is a digital currency for which information regarding ownership of the currency, transactions using the currency, and the creation of currency is stored on a cryptographically secured computerized database (e.g., a blockchain). Example cryptocurrencies include Bitcoin, Ethereum, Tether, and XRP, among others.

In an example mining operation, at least some of the computer chips 120 can be configured to receive an input signal 162, and generate one or more hashes using the input signal 162 as an input. For instance, at least a portion of the input signal 162 can represent an input sequence (e.g., an alphanumeric sequence, decimal sequence, hexadecimal sequence, binary sequence, etc.). Further, a computer chip 120 can generate one or more hashes based on the input sequence (e.g., by inputting the input sequence into a hash function to generate a hash). Example hash functions include those from the Secure Hash Algorithm (SHA) family of functions (e.g., SHA-1, SHA-2, SHA-3, etc.), Cyclic Redundancy Check (CRC), MurmurHash, BLAKE2, and Argon 2, among others.

In some implementations, at least some of the computer chips 120 are configured to generate one or more hashes based further on one or more nonce values (e.g., additional sequences of data, such as additional alphanumeric sequences, decimal sequence, hexadecimal sequence, binary sequence, etc.). As an example, a computer chip 120 can be configured to receive the input signal 162 representing an input sequence. Further, the computer chip 120 can be configured to generate several nonce values, and generate respective modified versions of the input sequence based on each of the nonce values. For instance, the can general several modified versions of the input sequence by concatenating the input sequence to different respective ones of the nonce values. Further, the computer chip 120 can generate hashes based on the modified input sequences (e.g., by providing at least some of the input sequences to the hash function as input).

In some implementations, at least some of the computer chips 120 are configured to generate one or more hashes until a generate hash satisfies one or more selection criteria. As an example, a computer chip 120 can be configured to generate hashes continuously until the value of a generated hash is greater than, less than, or equal to a particular value. As another example, a computer chip 120 can be configured to generate hashes continuously until a portion of the generated hash (e.g., a leading portion, a training portion, and/or a middle portion) is greater than, less than, or equal to a particular value.

The one or more selection criteria can be associated with mining operations with respect to a cryptocurrency, for which transactions are maintained on a blockchain. For example, one or more computer systems can maintain a blockchain that represents a distributed ledger of transactions conducted using a cryptocurrency. The blockchain includes a list of records (e.g., "blocks") that are securely linked together via cryptographic hashes. Each block includes a cryptographic hash of the previous block, a timestamp, and transaction data. Because each block includes information about the previous block, they effectively form a "chain," with each additional block linking to the ones before it. Thus, blockchain transactions are immutable in that, once they are recorded, the data in any given block cannot be altered retroactively without altering all of the subsequent blocks.

Further, blocks of the blockchain can be cryptographically signed using a proof-of-work consensus mechanism, in which hashes are generated until a generated hash meets a particular set of selection criteria. Upon identifying a hash that meets that set of selection criteria, the generated hash (and/or its nonce value) is used to generate a cryptographically signature for a block. As an example, for the Bitcoin cryptocurrency, the input data to a hash function represents a previous block (e.g., a cryptographic signature of that block), one or more transactions to include in a new block, and a nonce value (e.g., a randomly selected value). The hash generated by the hash function meets the set of selection criteria (e.g., generated a "hash hit") when the hash begins with at least a specified number of zeros (e.g., 19 zeros in a row; or some other number of zeroes).

In general, at least some of the computer chips 120 can generate hashes continuously (e.g., by generating multiple nonce values and generating hash values based on each of those nonce values) until the selection criteria are satisfied. Upon determining that a generated hash meets the selection criteria, a computer chip 120 generates output signal 164 representing the nonce value that was used to generate a hash hit (e.g., the nonce value that, when concatenated with the input sequence of the input signal 162, resulted in a hash value that met the selection criteria). The output signal 164 can be used (e.g., by the cryptomining asset 110 and/or one or more of its computer chips 120) to generate and cryptographically sign a new block for blockchain.

In general, the heat management system 150 manages the heat generated by each of the cryptomining assets 110 (e.g., heat generated by the computer chips 120 when performing computation tasks).

During an example operation, the heat management system 150 obtains sensor data from one or more sensors 130 of the computer chips 120. The sensor data represents the temperature at one or more locations on each of the computer chips 120. For example, the sensors 130 can be configured to measure the internal junction temperature of one or more of the computer chips 120, and output sensor data representing the measurements. When the temperature of a computer chip 120 becomes higher than a threshold temperature, the heat management system 150 reduces the computing performance target of that computer chip 120 by a first predetermined level, such as 10%. For example, the heat management system 150 can decrease the supply voltage that is provided to the computer chip 120, the clock frequency (also referred to as the operation frequency) of the computer chip 120, or both, until the computation speed of the computer chip 120 is reduced by 10%. The first predetermined level can be configured in the heat management system 150 to provide the asset with sufficient margin from overheat.

After the temperature of the computer chip 120 reduces (e.g., below the threshold temperature), the heat management system 150 can increase the computing performance target of the computer chip 120 by a second predetermined level. The heat management system 150 can repeat the decrease-and-increase process until the computer chip 120 reaches an optimized computing performance target that balances computation resource utilization and heat generation. In some implementations, the second predetermined level is lower than the first predetermined level such that the repeated adjustment converges.

In some implementations, the adjustment of computing performance target is accompanied by air cooling provided by an air cooling mechanism 140 having one or more variable speed fans. For example, the heat management system 150 can measure, apart from the temperature of the computer chips 120, the ambient temperature. The heat management system 150 can dynamically adjust the computing performance target while also air cooling the computer chips 120 using the air cooling mechanism 140 (e.g., by activating the fans of the air cooling mechanism and/or increasing the speed of the fans). Accordingly, the adjustment can continue until the heat management system 150 is able to cool the computer chips 120 using only air cooling. This mechanism can be helpful when the ambient temperature is insufficient to cool the computer chips 120 only for a limited period. After the period, because the computer chips 120 can be sufficiently cooled with air, the heat management system 150 can stop decreasing the computing performance target. In some implementations, the second predetermined level is equal to or higher than the first predetermined level.

As an illustrative example, when the temperature of a computer chip 120 (e.g., the internal junction temperature) becomes higher than a threshold temperature, the heat management system 150 reduces both the supply voltage and the clock frequency of that computer chip 120, such that the computation speed of the computer chip 120 is reduced. In some implementations, the threshold temperature can be 100° C., and upon the temperature of the computer chip 120 reaching or exceeding 100° C., the heat management system 150 can reduce the supply voltage by 15 mV (e.g., from an original supply voltage of approximately 290 mV) and reduce the clock frequency by 10%.

After the temperature reduces below the threshold temperature, the heat management system 150 incrementally increases the supply voltage (e.g., by increments smaller than the amount by which it was reduced) that is provided to the computer chip 120. In some implementations, the heat management system 150 can increment the supply voltage by 0.1 mV one or more times in a sequence.

If the temperature remains at an acceptable level (e.g., below the threshold temperature), the heat management system 150 can maintain the supply voltage and operation frequency, and/or continue increasing the supply voltage. However, if the temperature exceeds an acceptable level (e.g., above the threshold temperature), the heat management system 150 can reduce both the supply voltage and the operation frequency further, such that the computation speed of the computer chip 120 is further reduced. In some implementations, upon the temperature of the computer chip 120 reaching or exceeding the threshold temperature again (e.g., 100° C.), the heat management system 150 can again reduce the supply voltage by 15 mV and reduce the clock frequency by 10%.

The heat management system 150 can iteratively perform this process until optimized operating parameters is determined for each of the computer chips 120. As an example, the optimized operating parameters can include, for each of the computer chips 120, a particular supply voltage and a particular clock frequency that provides high computing performance in a thermally stable manner.

Although example parameter values are described above, other parameter values can also be used, either in addition to or instead of those described above.

In some implementations, the heat management system 150 can also reset the supply voltage and/or the threshold temperature (e.g., to their original values), such as when the cryptomining asset 110 is reset (e.g., powered off and back on), periodically, based on changes to the temperature of the ambient environment, or according to any other factor.

It is to be noted that although process steps, method steps, algorithms or the like may be described in a sequential order above, such processes, methods and algorithms may generally be configured to work in alternate orders, unless specifically stated to the contrary.

In some implementations, the first and/or second predetermined levels can be configured by the user in the heat management system 150. Further, these predetermined levels can be dynamically changed by the heat management system 150 based on the ambient temperature.

In some implementations, if decreasing the computing performance target of a computer chip 120 by the first predetermined level once is insufficient to cool the computer chip 120, the heat management system 150 can decrease the computing performance target of the computer chip 120 multiple times, by the first predetermined level each time, until sufficient cooling is achieved. Likewise, if increasing the computing performance target by the second predetermined level once is insufficient to bring the computing performance to a desirable level, the heat management system 150 can increase the computing performance target multiple times, by the second predetermined level each time, until sufficient computing performance is achieved.

Further, if decreasing the computing performance target of a computer chip 120 below a particular minimum performance threshold is insufficient to cool the computer chip 120, the heat management system 150 can turn off the computer chip 120 or place the computer chip 120 in a low power state (e.g., an "idle" state in which it does not perform hashing operations). For example, if (i) the supply voltage has been reduced below a minimum threshold voltage and/or (ii) the clock frequency of a computer chip 120 has been reduced below a minimum threshold frequency, but the temperature of the computer chip 120 remains above the threshold temperature, the heat management system 150 can turn off that computer chip 120 or place that computer chip 120 in a low power state.

In the example configuration shown in FIG. 1, the heat management system 150 is implemented separately from the cryptomining assets 110. This configuration can be beneficial, for example, in allowing a single heat management system 150 to manage several cryptomining assets 110 concurrently. However, in some implementations, the heat management system 150 can be implemented as a part of a cryptomining asset 110 (e.g., using software and/or hardware of the cryptomining asset 110).

In some implementations, the heat management system 150 can be configured to dynamically adjust the target computing performance of each of computer chips 120 individually. For example, the heat management system 150 can be configured to measure the temperature of each of the computer chips 120, and dynamically adjust the target computing performance of each of computer chips 120 individually based on the temperature of that computer chip 120 (e.g., as described above).

In some implementations, the heat management system 150 can be configured to dynamically adjust the target computing performance of multiple computer chips 120 as a group. For example, multiple computer chips 120 can be configured to operate according to the same supply voltage and the same clock frequency. Further, the heat management system 150 can be configured to measure the temperature of each of the computer chips 120. If the temperature of any of the computer chips 120 exceeds a threshold temperature, the heat management system 150 can (i) reduce the target computing performance of all of the computer chips 120 together and (ii) incrementally re-increase the target computing performance of all of the computer chips 120 together until an optimal computing performance target is obtained for the group of computer chips 120.

Figure 2:
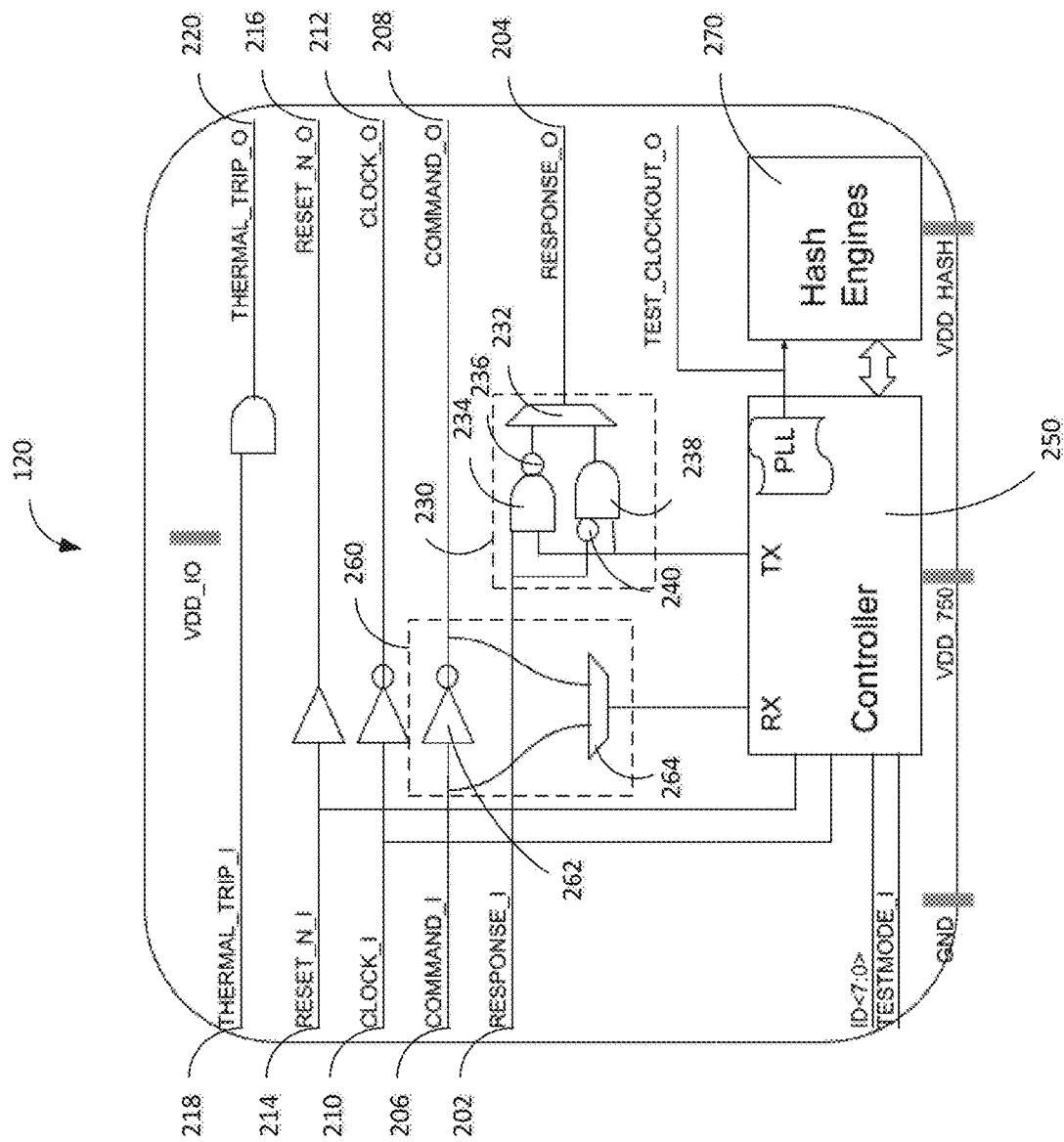
FIG. 2 illustrates a block diagram of an example computer chip for mining cryptocurrency.

FIG. 2 shows a schematic diagram of a computer chip 120 for signal processing, according to some implementations of the present disclosure. In at least some implementations, the computer chip 120 can be an integrated circuit (IC) chip, such as an ASIC.

As shown, the computer chip 120 includes multiple pairs of input and output terminals coupled to multiple buses. For example, the computer chip 120 includes input terminal 202 and output terminal 204 coupled to a response bus, input terminal 204 and output terminal 206 coupled to a command bus, input terminal 208 and output terminal 210 coupled to a clock bus, input terminal 212 and output terminal 214 coupled to a reset bus, and input terminal 218 and output terminal 220 coupled to a thermal trip bus.

In some implementations, input terminals 202, 206, 210, 214, and 218 of the computer chip 120 are coupled to output terminals of an upstream neighboring chip that is series connected to the IC chip using the multiple buses. In some implementations, output terminals 204, 208, 212, 216, and 220 of the computer chip 120 are coupled to input terminals of a downstream neighboring chip that is series connected to the computer chip 120 computer chip 120 using the multiple buses.

The computer chip 120 further includes circuit 230 for processing signals on the response bus. In some implementations, the computer chip 120 is configured to receive an input signal at input terminal 202 on the response bus, combine the input signal with a signal sent by controller 250 to generate a combined signal, and transmit the combined signal on the response bus by using output terminal 204.

In the shown example, the computer chip 120 includes multiplexer 232, AND gates 234 and 238, and inverters 236 and 240. In some implementations, multiplexer 232 is a circuit or a device that can be used to select one out of several input signals based on a control signal and route the selected input signal to an output. In some implementations, each one of AND gates 234 and 238 is a circuit or a device that performs a logical conjunction operation. In some implementations, each one of inverters 236 and 240 is a circuit or a device that performs a logical operation on its input signal and produces the logical complement (inverse) of the input at its output. As shown, an input terminal of inverter 236 is coupled to an output terminal of AND gate 234, and an output terminal of inverter 236 is coupled to an input terminal of multiplexer 232. An input terminal of AND gate 238 is coupled to an output terminal of inverter 240, and an output terminal of AND gate 238 is coupled to an input terminal of multiplexer 232.

In the shown example, multiplexer 232 can be configured to select, based on a control signal, one of two input signals including a first input signal that is received as an output signal of inverter 236 and a second input signal that is received as an output signal of AND gate 238, and transmit the selected input signal on the response bus.

The computer chip 120 further includes circuit 260 for processing signals on the command bus. In some implementations, circuit 260 is configured to receive an input signal on the command bus using input terminal 206, invert the input signal to generate an inverted signal, and transmit the inverted signal as an output signal on the second bus using output terminal 208. In some implementations, circuit 260 is further configured to conditionally forward the input signal or the inverted signal to controller 250 based on a control signal received by circuit 260.

In the shown example, circuit 260 includes inverter 262 and multiplexer 264. An input terminal of inverter 262 is coupled to input terminal 206 on the command bus, and an output terminal of inverter 262 is coupled to output terminal 208 on the command bus. Furthermore, the input terminal of inverter 262 is further coupled to a first input terminal of multiplexer 264, and the output terminal of inverter 262 is further coupled to a second input terminal of multiplexer 264.

In some examples, inverter 262 can be configured to invert an input signal received on the command bus to generate an inverted signal. In some examples, multiplexer 264 can be configured to select, based on a control signal, one of two input signals including a first input signal that is received as the input signal of inverter 262 and a second input signal that is received as the inverted signal of inverter 262, and transmit the selected input signal to controller 250.

In some implementation, controller 250 of the computer chip 120 is configured to manage and coordinate operations of various components within in the computer chip 120. Controller 250 can be configured to serve as an interface between hash engines 270) and other circuits or components of the computer chip 120. In some examples, controller 250 can be configured to receive an input signal from circuit 260, and transmits an output signal to circuit 230. In some examples, controller can be communicatively coupled to hash engines 270), and can obtain computation results from hash engines 270.

The computer chip 120 further includes one or more hash engines 270. In some implementations, each of the hash engines 270 includes hardware components configured to perform cryptographic hash computations. In some examples, hash engines 270) can perform the cryptographic hash computations using hash function algorithms such as SHA-1, SHA-256, or MD5, etc.

In some implementations, an example operating process of the computer chip 120 includes receiving an input signal by the computer chip 120 at input terminal 206 on the command bus. In some examples, the input signal can be received from an upstream neighboring chip that is series connected to the computer chip 120. The computer chip 120 performs an inverting operation on the input signal by using inverter 260 to generate an inverted signal, and transmits the inverted signal on the command bus. In some examples, the inverted signal can be transmitted on the command bus to a downstream neighboring chip that is series connected to the computer chip 120. The computer chip 120 can further conditionally forward the input signal or the inverted signal to controller 250 based on an odd or even configuration of the computer chip 120 in an ordered arrangement of multiple chips including the upstream neighboring chip, the computer chip 120, and the downstream neighboring chip. In some examples, when the computer chip 120 is an even chip on the command bus, circuit 260 can be instructed to forward the input signal to controller 250. When the computer chip 120 is an odd chip on the command bus, circuit 260) can be instructed to forward the inverted signal to controller 250.

After receiving a signal from circuit 260, controller 250 can instruct the hash engines 270 to perform cryptographs hash computations. Hash engines 270 can return a computation result to controller 250.

In some implementations, another example operating process of the computer chip 120 includes receiving an input signal by the computer chip 120 at input terminal 202 on the response bus. In some examples, the input signal can be received from an upstream neighboring chip that is series connected to the computer chip 120. The computer chip 120 can combine the input signal and a signal produced by controller 250 by using circuit 230 to generate a combined signal, and transmit the combined signal as an output signal on the response bus. The computer chip 120 can combine the input signal and the signal produced by controller 250 based on an even or odd configuration of the computer chip 120. In some examples, when the computer chip 120 is an even chip on the response bus, the computer chip 120 can combine the input signal and the signal produced by controller 250 by using AND gate 234 to generated a combined signal, and invert the combined signal by using inverter 236 to generate an inverted signal as an output signal on the response bus. In some examples, when the computer chip 120 is an odd chip on the response bus, the computer chip 120 can invert the input signal by using inverter 240 to generate an inverted signal, and combine the inverted signal and the signal produced by controller by using AND gate 238 to generate a combined signal as an output signal on the response bus. In some examples, the output signal of the computer chip 120 on the response bus can be transmitted to a downstream neighboring chip that is series connected to the computer chip 120.

In some examples, the signal produced by controller 250 can be generated based on one or more computation results from hash engines 270. In some examples, the signal produced by controller 250 can be an idle signal. In some examples, the signal produced by controller 350 has a format that includes ten bits, where the start bit of signal indicates a logic low state (e.g., "0"), and the stop bit of signal indicates a logic high state (e.g., "1"). The eight bits between the start bit and the stop bit are data bits. The data bits of signal can include or indicate the computation results from hash engines 270.

By using the above combine-and-forward method, the output signal can be promptly transmitted without undergoing synchronization or retiming processes. By eliminating store-and-forward mechanism for data, the circuit minimizes delays typically incurred during those processes. The combining and forwarding of the signals enable swift transmission without latency-inducing operations. Each computer chip includes components to invert communication signals at each chip. This deliberate inversion serves as a beneficial measure to prevent the accumulation of a specific class of noise. By inverting the signal at each chip, the noise that may have been introduced in previous stages of the circuit is counteracted, thus maintaining signal integrity. Each computer chip possesses the ability to self-discover its position within the electronic circuit, allowing it to determine whether it has an odd or even configuration in an ordered arrangement of the number of computer chips in the electronic circuit. This self-discovery enables the IC chip to handle the inversion of the communication signals internally, ensuring that the overall circuit functions as intended.

Example Processes

Figure 3:
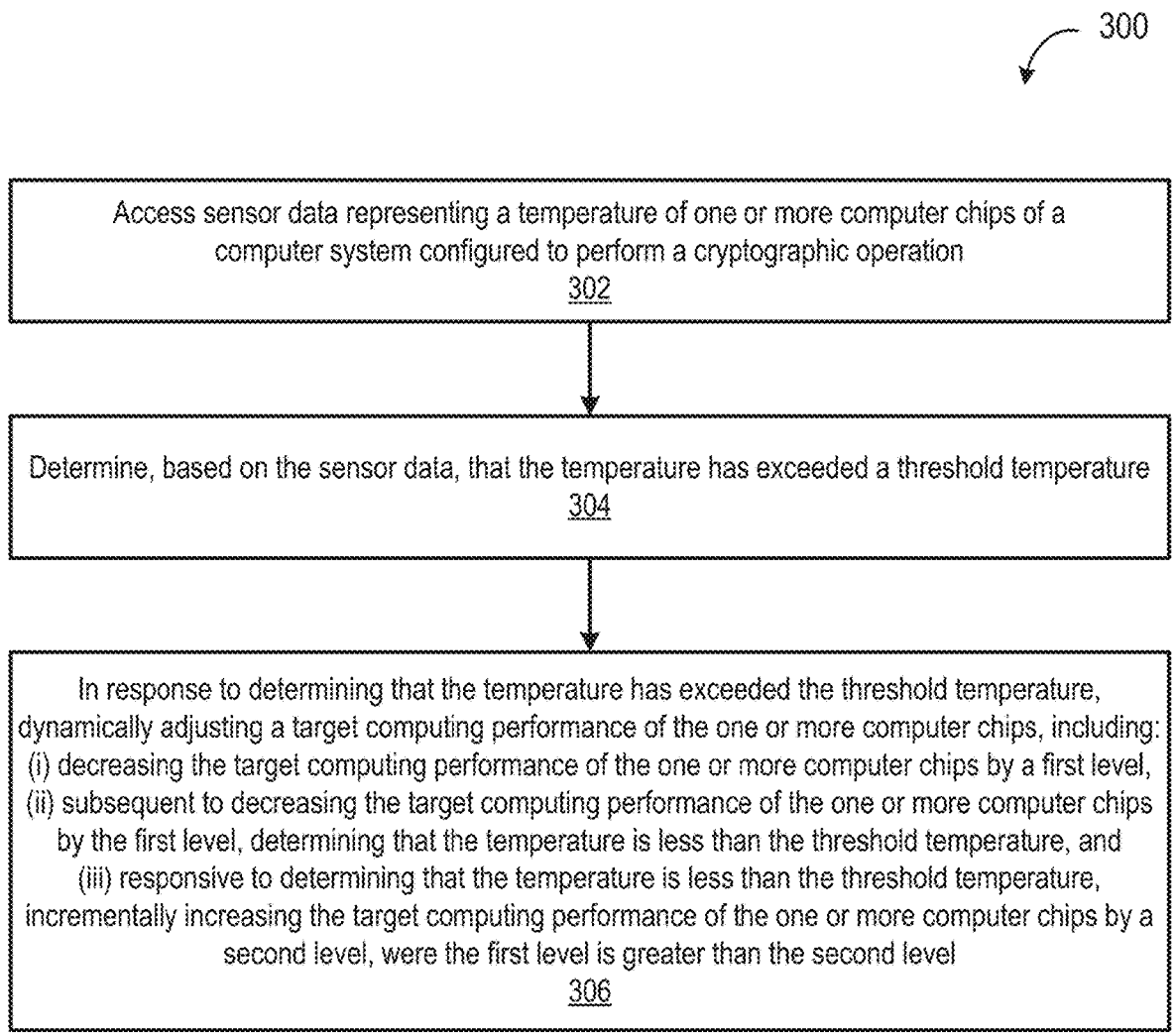
FIG. 3 illustrates an example process for managing heat in a cryptomining asset.

FIG. 3 illustrates an example process 300 for managing heat in a cryptomining asset. In some implementations, the process 200 can be performed by the system 100 described in this disclosure (e.g., the system 100 including the cryptomining asset(s) 110 and the heat management system 150 as described with reference to FIG. 1) using one or more processors (e.g., using the processor or processors 410 shown in FIG. 4).

In the process 300, a system accesses sensor data representing a temperature of one or more computer chips of a computer system configured to perform a cryptographic operation (302). As an example, the cryptographic operation can include mining a cryptocurrency.

Further, the system determines, based on the sensor data, that the temperature has exceeded a threshold temperature (304).

Further, responsive to determining that the temperature has exceeded the threshold temperature, the system dynamically adjusts a target computing performance of the one or more computer chips (306). Dynamically adjusting the target computing performance of the one or more computer chips includes (i) decreasing the target computing performance of the one or more computer chips by a first level, (ii) subsequent to decreasing the target computing performance of the one or more computer chips by the first level, determining that the temperature is less than the threshold temperature, and (iii) responsive to determining that the temperature is less than the threshold temperature, incrementally increasing the target computing performance of the one or more computer chips by a second level, where the first level is greater than the second level.

In some implementations, dynamically adjusting the target computing performance of the one or more computer chips can include adjusting a supply voltage of the one or more computer chips and/or adjusting a clock frequency of the one or more computer chips.

In some implementations, decreasing the target computing performance of the one or more computer chips by the first level can include decreasing a supply voltage of the one or more computer chips by a first voltage value and/or decreasing a clock frequency of the one or more computer chips by a first frequency value.

In some implementations, incrementally increasing the target computing performance of the one or more computer chips by the second level can include sequentially increasing the supply voltage of the one or more computer chips by a second voltage value a plurality of times, where the second voltage value is less than the first voltage value.

In some implementations, while incrementally increasing the target computing performance of the one or more computer chips by the second level, the system can determine, based on the sensor data, that the temperature has re-exceeded the threshold temperature. In response, the system can decrease the target computing performance of the one or more computer chips by a third level.

In some implementations, decreasing the target computing performance of the one or more computer chips by the third level can include decreasing the supply voltage of the one or more computer chips by a third voltage value and/or decreasing a clock frequency of the one or more computer chips by a third frequency value.

In some implementations, the system can determine that the supply voltage of the one or more computer chips is less than a threshold voltage, and in response, cause the one or more computer chips to transition to an idle state.

In some implementations, the system can determine that the clock frequency of the one or more computer chips is less than a threshold frequency, and in response, cause the one or more computer chips to transition to an idle state.

In some implementations, the system can dynamically adjust the target computing performance of the one or more computer chips by determining, based on the sensor data, that the temperature has reached a steady state while the target computing performance of the one or more computer chips is at a particular target computing performance level. In response, the system can maintain the target computing performance of the one or more computer chips at the particular target computing performance level.

In some implementations, the sensor data can represent internal junction temperature of the one or more computer chips.

In some implementations, the sensor data can further represent a temperature of an ambient temperature of the computer system. Further, the system can dynamically adjust the target computing performance of the one or more computer chips based on the ambient temperature.

In some implementations, the sensor data can represent a temperature of a plurality of computer chips of the computer system. Further, the system can dynamically adjust the target computing performance of the plurality of computer chips based on the sensor data.

In some implementations, the sensor data can represent a temperature of a single computer chip of the computer system. Further, the system can dynamically adjust the target computing performance of the single computer chip based on the sensor data.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 (e.g., the cryptomining asset(s) 110, computer chip(s) 120, heating management system 150, etc.) can be implemented using digital electronic circuitry, or in computer software, firmware, or hardware, or in combinations of one or more of them. In another example, the process 300 shown in FIG. 3 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 4:
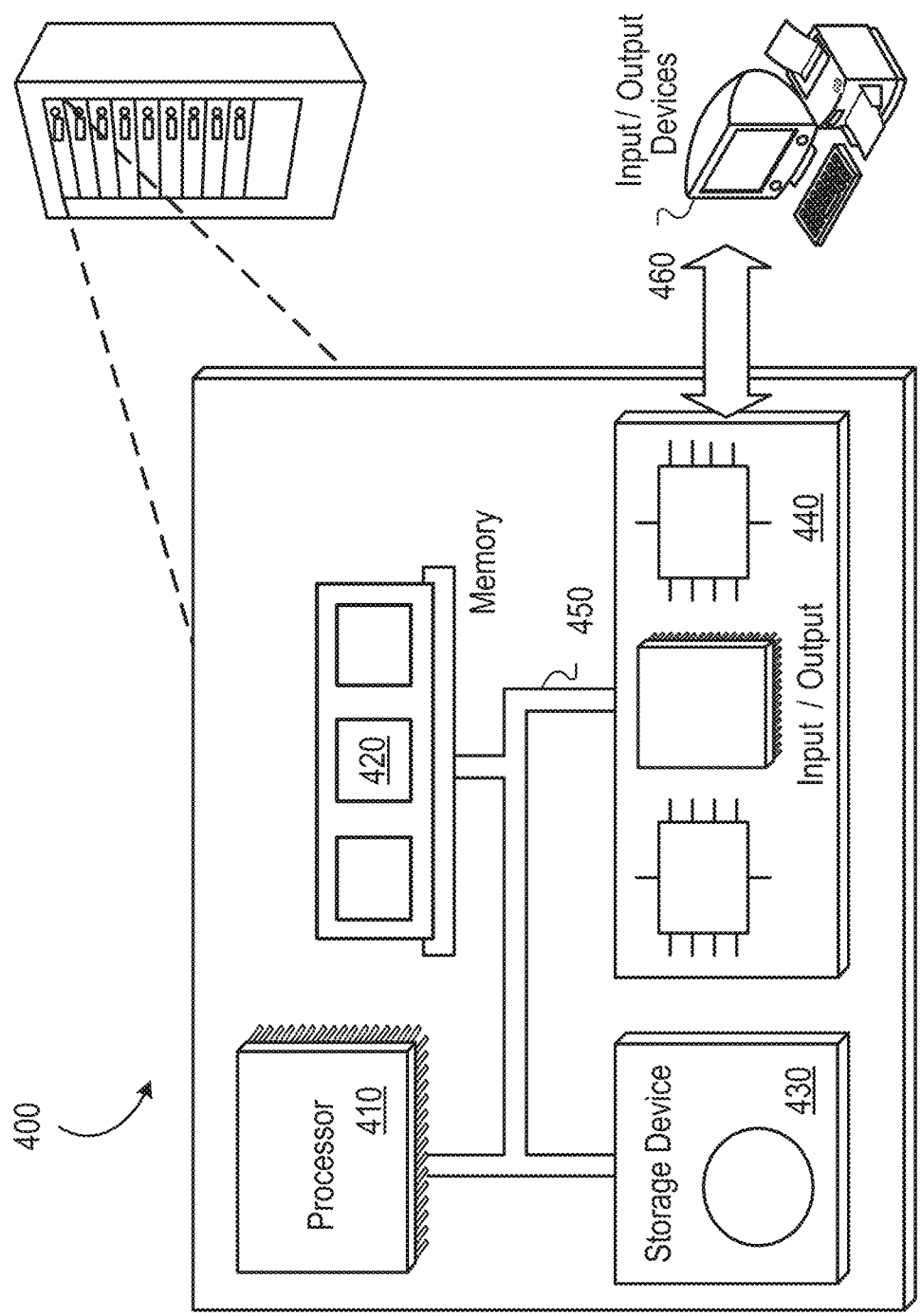
FIG. 4 illustrates an example computer system.

FIG. 4 illustrates an example computer system 400 that includes a processor 410, a memory 420, a storage device 430 and an input/output device 440. Each of the components 410, 420, 430 and 440 can be interconnected, for example, by a system bus 450. The processor 410 is capable of processing instructions for execution within the system 400. In some implementations, the processor 410 is a single-threaded processor, a multi-threaded processor, or another type of processor. The processor 410 is capable of processing instructions stored in the memory 420 or on the storage device 430. In some implementations, the central control logic circuitry 102, the computer chips 120 can be implemented using the processors 410 and/or using multiple such processors 410. The memory 420 and the storage device 430 can store information within the system 400.

The input/output device 440 provides input/output operations for the system 400. In some implementations, the input/output device 440 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 460. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
   accessing, by one or more processors, sensor data representing a temperature of one or more computer chips of a computer system configured to perform a cryptographic operation;
   determining, by the one or more processors based on the sensor data, that the temperature has exceeded a threshold temperature; and
   responsive to determining that the temperature has exceeded the threshold temperature, dynamically adjusting, by the one or more processors, a target computing performance of the one or more computer chips, wherein dynamically adjusting the target computing performance of the one or more computer chips comprises:
  decreasing the target computing performance of the one or more computer chips by a first level, wherein decreasing the target computing performance of the one or more computer chips by the first level comprises:
    decreasing a supply voltage of the one or more computer chips by a first voltage value, and
    decreasing a clock frequency of the one or more computer chips by a first frequency value;
  subsequent to decreasing the target computing performance of the one or more computer chips by the first level, determining that the temperature is less than the threshold temperature,
  responsive to determining that the temperature is less than the threshold temperature, incrementally increasing the target computing performance of the one or more computer chips by a second level, wherein the first level is greater than the second level, wherein incrementally increasing the target computing performance of the one or more computer chips by the second level comprises:
    sequentially increasing the supply voltage of the one or more computer chips by a second voltage value a plurality of times, wherein the second voltage value is less than the first voltage value,
  while incrementally increasing the target computing performance of the one or more computer chips by the second level, determining, based on the sensor data, that the temperature has re-exceeded the threshold temperature, and
  responsive to determining that the temperature has re-exceeded the threshold temperature, decreasing the target computing performance of the one or more computer chips by a third level.

2. The method of claim 1, wherein the cryptographic operation comprises mining a cryptocurrency.

3. The method of claim 1, wherein dynamically adjusting the target computing performance of the one or more computer chips comprises at least one of:
  adjusting the supply voltage of the one or more computer chips, or
  adjusting the clock frequency of the one or more computer chips.

4. The method of claim 1, wherein dynamically adjusting the target computing performance of the one or more computer chips comprises:
  adjusting the supply voltage of the one or more computer chips, and
  adjusting the clock frequency of the one or more computer chips.

5. The method of claim 1, wherein decreasing the target computing performance of the one or more computer chips by the third level comprises:
  decreasing the supply voltage of the one or more computer chips by a third voltage value, and
  decreasing a clock frequency of the one or more computer chips by a third frequency value.

6. The method of claim 1, further comprising:
  determining that the supply voltage of the one or more computer chips is less than a threshold voltage, and
  responsive to determining that the supply voltage of the one or more computer chips is less than the threshold voltage, causing the one or more computer chips to transition to an idle state.

7. The method of claim 1, further comprising:
  determining that the clock frequency of the one or more computer chips is less than a threshold frequency, and
  responsive to determining that the clock frequency of the one or more computer chips is less than the threshold frequency, causing the one or more computer chips to transition to an idle state.

8. The method of claim 1, wherein dynamically adjusting the target computing performance of the one or more computer chips comprises:
  determining, based on the sensor data, that the temperature has reached a steady state while the target computing performance of the one or more computer chips is at a particular target computing performance level, and
  responsive to determining that the temperature has reached a steady state while the target computing performance of the one or more computer chips is at the particular target computing performance level, maintaining the target computing performance of the one or more computer chips at the particular target computing performance level.

9. The method of claim 1, wherein the sensor data represents internal junction temperature of the one or more computer chips.

10. The method of claim 1, wherein the sensor data further represents an ambient temperature of the computer system, and
  wherein the method comprises dynamically adjusting the target computing performance of the one or more computer chips based on the ambient temperature.

11. The method of claim 1, wherein the sensor data represents a temperature of a plurality of computer chips of the computer system, and
  wherein the target computing performance of the plurality of computer chips is dynamically adjusted based on the sensor data.

12. The method of claim 1, wherein the sensor data represents a temperature of a single computer chip of the computer system, and
  wherein the target computing performance of the single computer chip is dynamically adjusted based on the sensor data.

13. A system comprising:
  a computer system configured to perform a cryptographic operation, wherein the computer system comprises:
    one or more computer chips,
    one or more sensors configured to generate sensor data representing a temperature of the one or more computer chips, and
    control circuitry communicatively coupled to the one or more computer chips and the one or more sensors, wherein the control circuitry is configured to:
      access the sensor data,
      determine, based on the sensor data, that the temperature has exceeded a threshold temperature, and
      responsive to determining that the temperature has exceeded the threshold temperature, dynamically adjust a target computing performance of the one or more computer chips, wherein dynamically adjusting the target computing performance of the one or more computer chips comprises:

decreasing the target computing performance of the one or more computer chips by a first level, subsequent to decreasing the target computing performance of the one or more computer chips by the first level, determine that the temperature is less than the threshold temperature, and responsive to determining that the temperature is less than the threshold temperature, incrementally increasing the target computing performance of the one or more computer chips by a second level, wherein the first level is greater than the second level.

14. The system of claim 13, wherein dynamically adjusting the target computing performance of the one or more computer chips comprises at least one of:

adjusting a supply voltage of the one or more computer chips, or adjusting a clock frequency of the one or more computer chips.

15. The system of claim 13, wherein dynamically adjusting the target computing performance of the one or more computer chips comprises:

determining, based on the sensor data, that the temperature has reached a steady state while the target computing performance of the one or more computer chips is at a particular target computing performance level, and responsive to determining that the temperature has reached a steady state while the target computing performance of the one or more computer chips is at the particular target computing performance level, maintaining the target computing performance of the one or more computer chips at the particular target computing performance level.

16. One or more non-transitory computer readable media storing instructions that, which executed by one or more processors, cause the one or more processors to perform operations comprising:

accessing sensor data representing a temperature of one or more computer chips of a computer system configured to perform a cryptographic operation;

determining, based on the sensor data, that the temperature has exceed a threshold temperature;

responsive to determining that the temperature has exceeded the threshold temperature, dynamically adjusting a target computing performance of the one or more computer chips, wherein dynamically adjusting the target computing performance of the one or more computer chips comprises:

decreasing the target computing performance of the one or more computer chips by a first level, subsequent to decreasing the target computing performance of the one or more computer chips by the first level, determining that the temperature is less than the threshold temperature, and responsive to determining that the temperature is less than the threshold temperature, incrementally increasing the target computing performance of the one or more computer chips by a second level, wherein the first level is greater than the second level.

17. The one or more non-transitory computer readable media of claim 16, wherein dynamically adjusting the target computing performance of the one or more computer chips comprises at least one of:

adjusting a supply voltage of the one or more computer chips, or adjusting a clock frequency of the one or more computer chips.

18. The one or more non-transitory computer readable media of claim 16, wherein dynamically adjusting the target computing performance of the one or more computer chips comprises:

determining, based on the sensor data, that the temperature has reached a steady state while the target computing performance of the one or more computer chips is at a particular target computing performance level, and responsive to determining that the temperature has reached a steady state while the target computing performance of the one or more computer chips is at the particular target computing performance level, maintaining the target computing performance of the one or more computer chips at the particular target computing performance level.

\* \* \* \* \*